No. 770,748. PATENTED SEPT. 27, 1904.
N. W. GALES.
LINER FOR CENTRIFUGAL LIQUID SEPARATORS.
APPLICATION FILED NOV. 25, 1902.
NO MODEL.

WITNESSES:
D. A. Kennedy
J. F. Albrecht

INVENTOR
Nicholas W. Gales,
BY
G. C. Kennedy,
ATTORNEY

No. 770,748.

Patented September 27, 1904.

UNITED STATES PATENT OFFICE.

NICHOLAS W. GALES, OF WATERLOO, IOWA.

LINER FOR CENTRIFUGAL LIQUID-SEPARATORS.

SPECIFICATION forming part of Letters Patent No. 770,748, dated September 27, 1904.

Application filed November 25, 1902. Serial No. 132,805. (No model.)

*To all whom it may concern:*

Be it known that I, NICHOLAS W. GALES, a citizen of the United States of America, and a resident of Waterloo, Blackhawk county, Iowa, have invented certain new and useful Improvements in Liners for Centrifugal Liquid-Separators, of which the following is a specification.

My invention relates to improvements in liners for centrifugal liquid-separators, and especially to the class of liners which are composed of superimposed separated conical disks; and the object of my improvement is to so vary the manner of passing the unskimmed milk through the disks as to more thoroughly utilize the whole surface of said disks, thereby increasing the capacity of separation of the bowl.

This invention is intended to be an improvement upon the liner upon which a patent has heretofore been issued to me on March 4, 1902, under No. 694,736.

The object of my said improvement is attained by the means illustrated in the accompanying drawings, in which—

Figure 2:
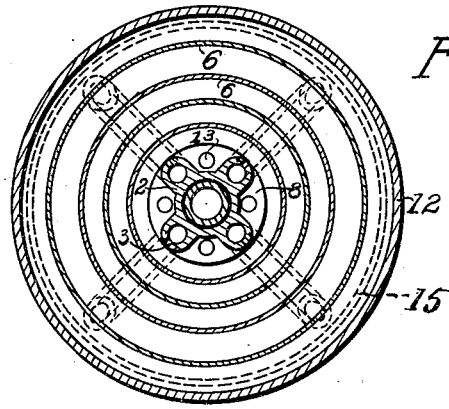
Figure 3:
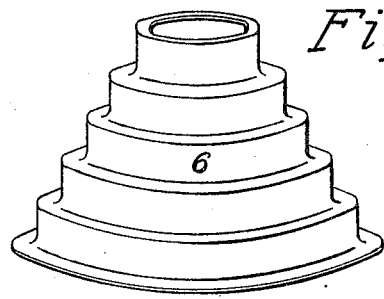
Figure 1:
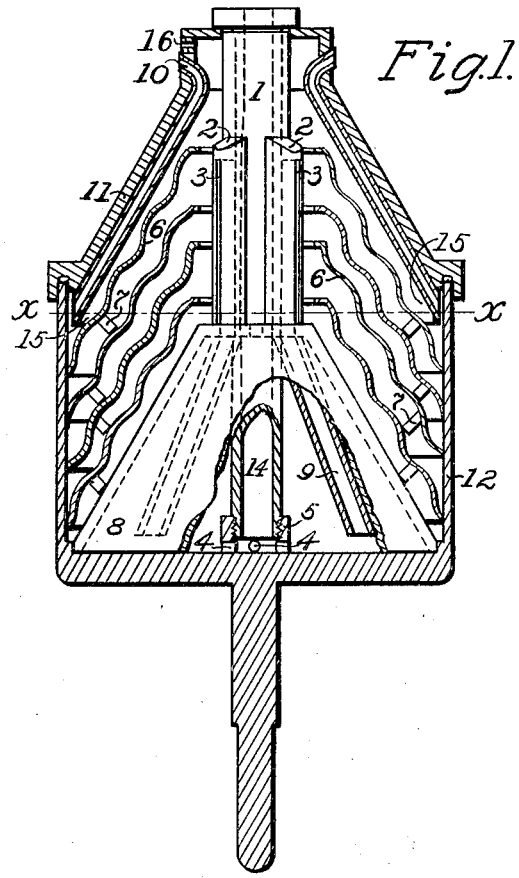
Figure 4:
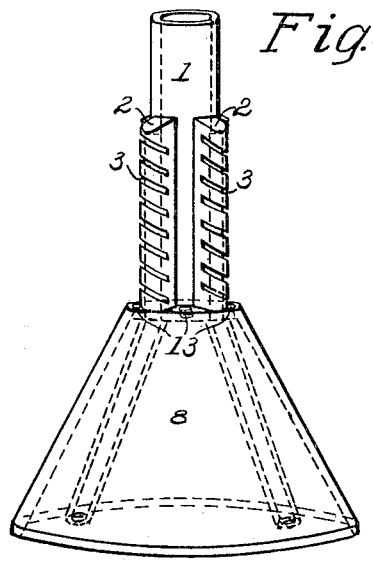

Figure 1 is a vertical section of a separator-bowl containing my improved form of liner. Fig. 2 is a horizontal sectional view of the bowl and liner along the line $xx$ of Fig. 1. Fig. 3 is a perspective view of one of the corrugated conical disks; and Fig. 4 is a perspective view of one of the inner milk-distributing devices, showing alternative forms of milk-spraying orifices.

Similar numbers refer to similar parts throughout the several views.

The separator-bowl shown is constructed in two parts, the upper part 11 fitting over the lower part 12. About the central point of the bottom of the inner side of the bowl is fitted a boss 5, which engages the thread on the outer side of the lower end of the milk-tube 14, keeping the latter in its proper position within the bowl, but permitting its withdrawal when unscrewed. The milk-tube 14 is passed completely through a hollow casting constituting the inlet-tube 1 and has its upper end open for the introduction of milk from without. The boss 5 is provided with the radial openings 4 on a level with the bottom of the bowl. A separating-cone 8 has its upper truncated edge connected with the lower end of the casting or inlet-tube 1 and has its lower edge in close contact with the bottom of the bowl. In the upper horizontal end of the truncated cone 8 are placed openings 13 to serve as exits for such of the cream as is separated within said cone. Several milk-exit tubes 9 are placed along the inner periphery of the cone 8, their upper ends passing through the upper truncated part of the cone and communicating with the tubes 2, which extend vertically upward along the outer side of the tube 1 and are here shown as cast with it. In any event they stand wholly within the "cream zone" just around the tube 1; but because they are spaced from each other and the spaces aline with the openings 13 the passage of the cream upward through said zone is not impeded. The lower ends of the tubes 9 open near the bottom of the bowl adjacent the lower edge of the cone 8. The upper ends of the tubes 2 are closed; but said tubes communicate with the interior of the bowl above the cone 8 by means of vertical slots 3, through which the milk is sprayed radially outward through the influence of centrifugal force. An alternative form of communication is shown in Fig. 4, in which the vertical slots are replaced by a series of horizontally-disposed or obliquely-cut parallel slots. A cream-exit 16 is placed in the upper part of the bowl 11, and milk-exits for the blue or skimmed milk are placed along the inner periphery of the conical part 11, their inlets close to the inner periphery of the lower cylindrical part 12 and their outlets near the top of the bowl. A narrow flat ring 15, extending horizontally around the axis of the bowl, is attached to the lower inner ends of the milk-exit tubes 10. This ring prevents particles of separated cream above the lower ends of the tubes 10 from mingling with and being carried out with the current of skimmed milk ascending along the inner periphery of the bowl. The space in the bowl above the separating-cone 8 is filled with a series of superposed open truncated cones 6. These separating devices are stepped or corrugated concentrically, but at no points do they touch each other, and their truncated tops are open sufficiently to clear the cream zone and the spraying-tubes 2. The separating-cones 6 are spaced apart by means of studs 7, the lowermost cone or separating device 6 being supported above and around the separating-cone 8.

Milk is introduced into the tube 1, whence it passes through the tube 14 and openings 4 into that inner chamber of the bowl which is bounded by the bottom of the bowl and the inner periphery of the separating-cone 8. As the milk is sprayed outwardly along the floor of the bowl part of its cream is separated and seeks the central zone thereof and passes upwardly into the cream zone of the uppermost compartment through the exits 13. The remaining milk, still rich with unseparated cream, arrives at the inner periphery of the cone 8 and issues thence, passing upwardly through the tubes 9 into the tubes 2, whence it is sprayed outwardly radially through the slots 3, impinging against the surfaces of the separating devices or stepped truncated cones 6. The milk impinging first upon the under surfaces of the stepped cones bounds to the upper surfaces of the oppositely-disposed cones, again rebounding and in the process incidentally separating the cream thoroughly, the latter finding its way back to the inner axial cream zone and passing upward between the tubes 2 and out of the bowl through the exit 16. The heavier watery components of the milk pass in layers outwardly and obliquely downward along the surfaces of the separating devices 6, whose corrugations increase said surface and correspondingly retard the movement of the milk, permitting greater opportunity for its separation. As the blue or skimmed milk arrives at the inner periphery of the bowl it is deflected upward, issuing from the bowl through the exit-tubes 10. In this form of liner an increase in the bowl's capacity of separation is shown over the amount of separation effected by the liner shown in my patent aforesaid, in this that the whole of the extent of the surfaces of the stepped corrugated cones is used, owing to the manner in which the partially-separated milk is sprayed radially outwardly against them. In the aforesaid patented form the upper portions of the separating-cones received but little of the ejected milk with a consequent loss of separating efficiency. This loss I have prevented by permitting the milk to be conducted to and sprayed through slots in the tubes 2 directly against the whole of the surfaces of the separating-cones from top to bottom, thus using all of the frictional retarding effect thereof.

I consider important the arrangement of the tubes 2 within the cream zone, yet the milk within these tubes is separated from the cream by their walls, the cream has vertical channels in which to rise, and the vertical slots 3 spray the milk radially outward between the cream zone and the "neutral zone" at points where its lateral flow does not conflict with the axial flow of the cream, but where a backward or upward movement of separated cream will not be necessary before the latter reaches the axial zone. If horizontal slots 3 are used, the partially-separated milk is delivered from the tubes 2 partially into the cream zone near the ends of the slots at points between the cream and neutral zones at the centers of the slots, but at no place into the neutral zone, which would require a backward or inward movement of the cream in this milk in order that it might reach the pure cream zone. On removing the conical portion 11 the cones 6 can be withdrawn and the inlet-tube 1 with tubes 2 can be withdrawn independently of the cones, or at any time the milk-tube 14 can be unscrewed from the boss 5 by turning it from the upper end and slipped out of the inlet-tube 1 without disturbing the other parts.

Having described my invention, what I claim as new, and desire to secure by Letters Patent, is—

1. In a centrifugal cream-separator, the combination with the rotary casing having outlets for the cream and for the blue milk, and a series of spaced corrugated separating-cones contained therein; of an inlet for the full milk consisting of a casting inclosing the axis of the casing, and a series of upright tubes integral with said casting and separated from the interior thereof by solid walls, said tubes being spaced from each other around the casting so as to leave cream-channels between them, and having slots in their outer sides opening between said separating-cones, and means at the lower end of said casting for partially separating the milk, for directing the cream upward into said channels, and for directing the partially-separated milk upward into said tubes.

2. In a centrifugal cream-separator, the combination with the rotary casing having outlets for the cream and for the blue milk, and a series of spaced corrugated cones contained therein; of an inlet for the full milk consisting of a casting inclosing the axis of the casing, and a series of upright tubes around said casting and separated from the interior thereof by solid walls, said tubes having openings in their outer sides opening between said separating-cones; a truncated cone connecting the bottom of the casting with the bottom of the casing, blue-milk tubes within this cone leading upward along its walls and communicating with the tubes around the casting, and a milk-tube for the inflowing milk passing downward through the casting and delivering at the center of the bottom of this cone.

3. In a centrifugal cream-separator, the combination with the rotary casing having outlets for the cream and for the blue milk, and a series of spaced corrugated separating-cones contained therein; of an inlet for the full milk consisting of a casting inclosing the axis of the casing, and a series of upright tubes spaced from each other around the casting so as to leave cream-channels between them and having slots in their outer sides opening between said separating-cones, a truncated cone connecting the bottom of the casting with the bottom of the casing and having openings in its top communicating with said cream-channels, blue-milk tubes within this cone leading upward along its walls and communicating with the tubes around the casting, and a milk-tube for the inflowing milk passing downward through the casting and delivering at the center of the bottom of this cone.

4. In a centrifugal cream-separator, the combination with the rotary casing having outlets for the cream and for the blue milk, and a series of spaced separating-cones contained therein; of an inlet for the full milk consisting of a casting inclosing the axis of the casing, and a series of upright tubes spaced from each other around the casting so as to leave cream-channels between them, each tube having a series of horizontal slots in its outer side opening between said separating-cones, a truncated cone connecting the bottom of the casting with the bottom of the casing and having openings in its top communicating with said cream-channels, blue-milk outlets within this cone communicating with the tubes around the casting, a threaded boss secured to the bottom of the casing at the center of this cone and having radial openings, and a milk-tube for the inflowing milk passing loosely downward through the casing and detachably screwed into said boss.

Signed by me at Waterloo, Iowa, this 10th day of November, 1902.

NICHOLAS W. GALES.

Witnesses:
J. H. GOSWILLER,
W. E. BROWN.